United States Patent
Takasawa et al.

(10) Patent No.: US 11,941,091 B2
(45) Date of Patent: Mar. 26, 2024

(54) INFORMATION PROCESSING SYSTEM, SERVICE SYSTEM, AND ELECTRONIC DEVICE USING A LICENSE KEY INCLUDING SETTING INFORMATION

(71) Applicant: SEIKO EPSON CORPORATION, Tokyo (JP)

(72) Inventors: Jun Takasawa, Nagano (JP); Yasuhiro Oshima, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 636 days.

(21) Appl. No.: 17/032,426

(22) Filed: Sep. 25, 2020

(65) Prior Publication Data

US 2021/0097152 A1   Apr. 1, 2021

(51) Int. Cl.

| G06F 21/10 | (2013.01) |
|---|---|
| G06Q 10/10 | (2023.01) |
| G06Q 10/20 | (2023.01) |
| G06Q 30/016 | (2023.01) |
| G06Q 30/018 | (2023.01) |
| G06Q 50/18 | (2012.01) |
| H04L 9/32 | (2006.01) |
| H04L 9/40 | (2022.01) |
| G06Q 20/12 | (2012.01) |

(52) U.S. Cl.
CPC .......... G06F 21/105 (2013.01); G06Q 10/10 (2013.01); G06Q 10/20 (2013.01); G06Q 30/016 (2013.01); G06Q 30/0185 (2013.01); G06Q 50/18 (2013.01); H04L 9/3247 (2013.01); H04L 63/0823 (2013.01); G06F 21/1011 (2023.08); G06Q 20/1235 (2013.01); G06Q 2220/145 (2013.01); G06Q 2220/18 (2013.01)

(58) Field of Classification Search
None
See application file for complete search history.

(56) References Cited

U.S. PATENT DOCUMENTS

| 9,378,006 | B2 | 6/2016 | Fujii | |
|---|---|---|---|---|
| 2002/0054601 | A1* | 5/2002 | Barraclough | ....... H04L 12/2856 725/37 |
| 2003/0161335 | A1* | 8/2003 | Fransdonk | ......... G06Q 20/3823 370/401 |
| 2009/0235363 | A1 | 9/2009 | Tomita | |
| 2014/0215454 | A1 | 7/2014 | Fujii | |
| 2018/0006904 | A1* | 1/2018 | Arnold | .................. H04L 41/142 |

FOREIGN PATENT DOCUMENTS

| JP | 2009224826 A | 10/2009 |
|---|---|---|
| JP | 2014146113 A | 8/2014 |

OTHER PUBLICATIONS

Office Action for JP Patent Application No. JP2019-176899, dated May 2, 2023, 6 pages of Office Action.

* cited by examiner

Primary Examiner — William J. Goodchild
(74) Attorney, Agent, or Firm — CHIP LAW GROUP

(57) ABSTRACT

An information processing system for receiving a service using an electronic device, the information processing system includes an acquisition section configured to acquire a license key for using the service issued by a server system and a processing section. The license key includes setting information to be used when the electronic device uses the service. The processing section acquires the setting information included in the acquired license key and performs setting processing of the electronic device based on the acquired setting information.

9 Claims, 7 Drawing Sheets

SETTING INFORMATION

| SERVER DESTINATION INFORMATION | SERVICE USER ID | REMOTE MAINTENANCE ENABLED/DISABLED | CERTIFICATE SERVER ID | CERTIFICATE SERVER PASSWORD |
|---|---|---|---|---|

INFORMATION PROCESSING SYSTEM, SERVICE SYSTEM, AND ELECTRONIC DEVICE USING A LICENSE KEY INCLUDING SETTING INFORMATION

The present application is based on, and claims priority from JP Application Serial Number 2019-176899, filed Sep. 27, 2019, the disclosure of which is hereby incorporated by reference herein in its entirety.

BACKGROUND

1. Technical Field

The present disclosure relates to an information processing system, a service system, and an electronic device.

2. Related Art

To date, a method of using a key for receiving a service utilizing an electronic device is known. For example, JP-A-2009-224826 discloses an image forming apparatus in which when an input license key is determined as a proper code, an optional function is enabled. By performing authentication using a license key, enabling the optional function in an unauthorized manner, or the like is prevented.

When a user receives a service utilizing an electronic device, it sometimes becomes necessary to perform setting processing in accordance with the service. To date, inputting a license key and inputting setting information are separately carried out. Also, a plurality of items are sometimes necessary to be set, and thus a large burden on the setting is imposed on a service user.

SUMMARY

According to an aspect of the present disclosure, there is provided an information processing system for receiving a service using an electronic device, the information processing system including: an acquisition section configured to acquire a license key for using the service issued by a server system; and a processing section, wherein the license key includes setting information to be used when the electronic device uses the service, and the processing section acquires the setting information included in the acquired license key and performs setting processing of the electronic device based on the acquired setting information.

DESCRIPTION OF EXEMPLARY EMBODIMENTS

Figure 1:
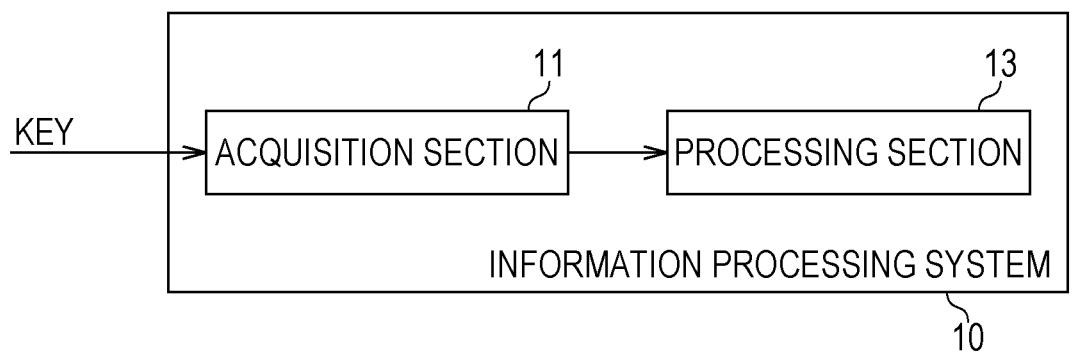
FIG. 1 is an example of the configuration of an information processing system.

In the following, a description will be given of the present embodiment. In this regard, the present embodiment described below will not unreasonably limit the contents of the present disclosure disclosed in the scope of the appended claims. Also, all the components described in the present embodiment are not necessarily required for indispensable elements of the present disclosure.

1. Overview

First, a description will be given of a method according to the present embodiment. To date, a method of providing and utilizing services using an electronic device is known. In the present embodiment, as described with reference to FIG. 1, it is assumed that a monitoring service is provided for monitoring the operating state of an electronic device 100 by transmitting the operation information of the device 100, and the like to a server system 400. The transmitted information is used by the other services, such as a maintenance service of the electronic device 100, an accounting service, and the like. Also, the maintenance of the electronic device 100 may be performed by remote operation. As described later with reference to FIG. 11 and FIG. 12, the service according to the present embodiment may include a remote maintenance service. In this regard, a service provider is, for example, a manufacturer of the electronic device 100, or the like, and a service user is a customer who has purchased the electronic device 100, but the service provider and the service user are not limited to these.

The service provider manages a service by issuing a license key to a service user. Here, a license key refers to information for certifying that the service user has a right to use the service. A license key according to the present embodiment may be referred to as a license code, or the like. For example, the server system 400 managed by the service provider holds information on the issued license keys, and performs license authentication processing that determines whether or not a service user is an authorized user based on the information. In this manner, for example, it is possible to prevent a third person who is not paying a service charge from using the service in an unauthorized manner. Alternatively, it is possible to prevent an electronic device purchaser who has no intention to use the service from being mistakenly provided with the service.

In this regard, a license key may be managed in association with the configuration information of the electronic device 100 for which the license key is used. The configuration information of the electronic device 100 refers to, for example, a MAC address assigned to the hardware included in the electronic device 100, a hash value obtained based on the MAC address, and the like. In this manner, by managing a license key in association with the electronic device 100, it becomes possible to prevent unauthorized use of a license key, or the like. In addition, various methods are known for managing a license key and authentication processing using a license key, and it is possible to apply those methods in the present embodiment.

It is possible to determine whether or not a service user has a right to use a service by using a license key. However, for using a service utilizing the electronic device 100, it is necessary to perform setting in accordance with the service in addition to certify the above-described right. For example, in the case of a monitoring service, it is necessary to set a transmission destination of the operation information, and the like. In the case of a remote maintenance service, it is necessary to obtain an electronic certificate for establishing a secure communication.

In a related-art method, a service user obtains setting information to be used for the setting from a service provider separately from a license key. It is necessary to for the service user to separately input a license key, for example, using a terminal device 200 described later and input the setting information. As described later with reference to FIG. 5, there are sometimes a plurality of setting items, and it is necessary for the service user to input respective setting values for the plurality of setting items. For example, a setting screen including a plurality of input fields is displayed on a display section 230 of the terminal device 200, and the service user inputs a setting value corresponding to a setting item in each input field. Accordingly, the setting work becomes a burden on the service user. Also, when there is a setting mistake or a setting omission, a setting error occurs, and thus it is not possible for the service user to suitably use a service using the electronic device 100. Also, the electronic device 100 might behave abnormally due to the setting error, or the like. Further, it is necessary to confirm and modify each of the plurality of setting items to eliminate a setting error, and thus a heavy burden is imposed to identify the cause.

FIG. 1 is a diagram illustrating the configuration of an information processing system 10. The information processing system 10 is an information processing system for receiving a service utilizing the electronic device 100, and includes an acquisition section 11 for acquiring a license key for utilizing a service issued by a server system 400 and a processing section 13. A license key according to the present embodiment includes setting information to be used when the electronic device 100 utilizes the service. The processing section 13 acquires the setting information included in the acquired license key, and performs the setting processing of the electronic device 100 based on the acquired setting information. In this regard, the information processing system 10 is not limited to have the configuration in FIG. 1, and it is possible to carry out various variations, such as adding the other components, and the like.

In a method according to the present embodiment, a license key for certifying a right to utilize a service includes the setting information necessary for using the service. When a service user inputs a license key, it becomes therefore possible for the information processing system 10 to perform the setting processing without separately performing the input operation of the setting information. Accordingly, it becomes possible to reduce the user burden on the setting processing and prevent a setting error caused by a setting mistake or a setting omission.

Figure 2:
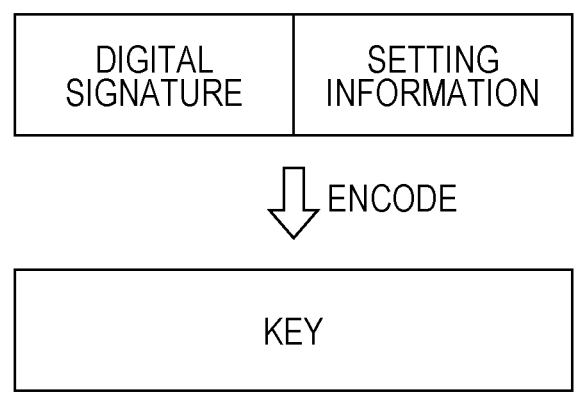
FIG. 2 is an explanatory diagram of a license key according to the present embodiment.

FIG. 2 is an explanatory diagram of a license key according to the present embodiment. As illustrated in FIG. 2, a license key may be information based on the setting information and a digital signature of an issuer who has issued a license key given to the setting information. Here, a digital signature represents a result of encryption processing performed on a hash value calculated based on the setting information using a private key of a service provider.

As described later with reference to FIG. 8, the setting information includes destination information on a server, and the like. Accordingly, when a third person having a malicious intent has tampered with the information included in a license key, or when a service user mistakenly use a license key created by a third person in an unauthorized way, the operation information on the electronic device 100 might leak out. Alternatively, the third person might perform improper remote operation on the electronic device 100. On the other hand, by including a digital signature in a license key, it is possible to confirm that the license key has been issued by an authorized service provider, and the setting information has not been tampered with.

As illustrated in FIG. 2, the license key according to the present embodiment may be information to be generated by encoding the setting information and a digital signature. For example, the server system 400 generates a license key by encoding the binary data produced by concatenating the digital signature and the setting information using Base64. Base64 is a publicly known method, and thus the detailed description thereof will be omitted. However, an encoding method to be used for generating a license key according to the present embodiment is not limited to Base64. For example, an encoding method capable of encoding original data may be used.

The acquisition section 11 of the information processing system 10 is, for example, a communication interface that communicates with an external device. The communication interface receives a license key issued by the server system 400 directly from the server system 400 or via another device, such as the terminal device 200 described later, or the like.

The processing section 13 is constituted by the following hardware components. The hardware may include at least one of a digital signal processing circuit and an analog signal processing circuit. For example, the hardware may include one or a plurality of circuit devices implemented on a circuit substrate, or one or a plurality of circuit elements. The one or the plurality of circuit devices are, for example, ICs, and the like. The one or the plurality of circuit elements are, for example, resistors, capacitors, and the like.

Also, the processing section 13 may be realized by the following processors. The information processing system 10 according to the present embodiment includes a memory that stores information and a processor that operates based on the information stored in the memory. The information includes, for example, a program and various kinds of data, and the like. The processor includes hardware. It is possible for the processor to use various processors, such as a CPU (central processing unit), a GPU (graphics processing unit), a DSP (digital signal processor), or the like. The memory may be a semiconductor memory, such as an SRAM (static random access memory), a DRAM (dynamic random access memory), or the like, or may be a register, or a magnetic storage device, such as a HDD (hard disk drive), or the like, or an optical storage device, such as an optical disc device, or the like. For example, the memory stores computer-readable instructions, and the processor executes the instructions so as to realize the functions of the processing section 13 as processing. The instructions here may be instructions in an instruction set included in a program, or instructions specifying operation for the hardware circuit of the processor.

The information processing system 10 is, for example, included in the electronic device 100. In this case, the acquisition section 11 of the information processing system 10 may be the communication section 120 of the electronic device 100. The processing section 13 of the information processing system 10 may be the processing section 110 of the electronic device 100.

Alternatively, a part or most of the processing of the information processing system 10 according to the present embodiment may be realized by a program. In other words, each section of the information processing system 10 according to the present embodiment may be realized as a module of a program that runs on the processor. For example, the acquisition section 11 is realized as a reception processing module that receives a license key issued by the server system 400. The processing section 13 is realized as a setting module that performs the setting processing for utilizing a service based on the license key.

In this case, a processor, such as a CPU, or the like executes the program so as to realize the information processing system 10 according to the present embodiment, or the like. Specifically, the program stored in a non-transitory information storage medium is read, and the processor, such as CPU, or the like executes the read program. Here, the information storage medium stores the program, data, and the like, and it is possible to realize the functions thereof by an optical disc, such as a DVD, a CD, or the like, an HDD, a memory, such as a nonvolatile memory, a RAM, or the like. The information storage medium is a computer-readable device. The processor, such as a CPU, or the like performs various kinds of processing according to the present embodiment based on the program stored on the information storage medium. That is to say, the information storage medium stores the program for causing the computer to function as the acquisition section and the processing section of the information processing system 10 according to the present embodiment. The computer is a device including an operation section, a processing section, a storage section, and an output section.

Also, as described later, the information processing system 10 according to the present embodiment may include devices other than the electronic device 100. The devices other than the electronic device 100 include, for example, the terminal device 200. In this case, each section of the information processing system 10 may be realized as hardware or a program module in the same manner. This is the same in the case where the information processing system 10 is realized by distributed processing including the electronic device 100 and a plurality of devices, such as the terminal device 200, and the like.

2. Example of System Configuration

Figure 3:
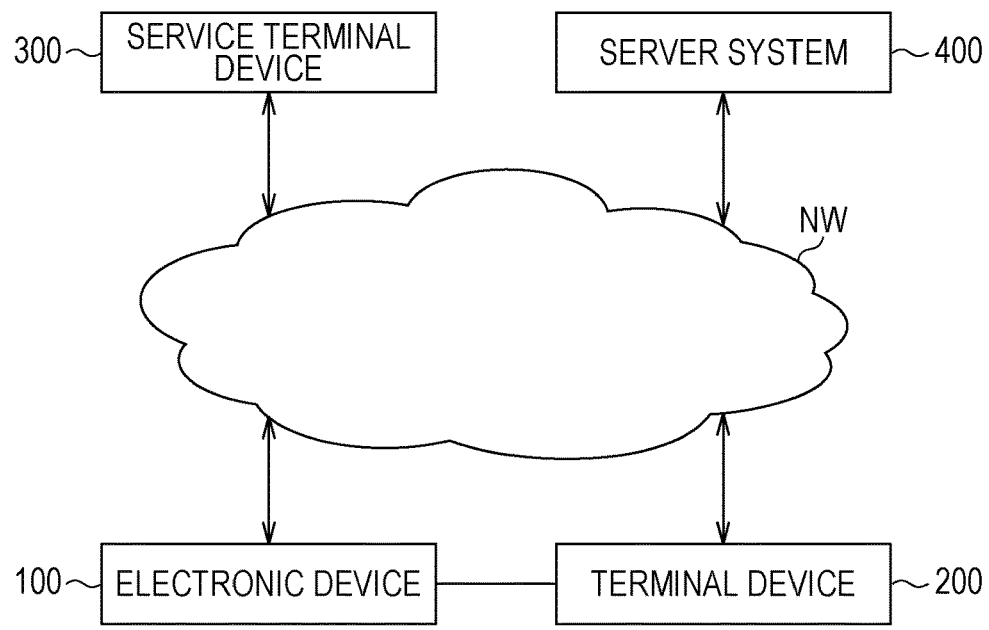
FIG. 3 is an example of the configuration of a service system including an electronic device and a server system.

FIG. 3 is an example of the configuration of a service system including an electronic device 100 and a server system 400. The service system includes the electronic device 100, the terminal device 200, the service terminal device 300, and the server system 400. The electronic device 100, the terminal device 200, the service terminal device 300, and the server system 400 are connected via a network NW. In the present embodiment, the network NW is assumed to be a public communication network, such as the Internet, or the like, but may be a network line, such as a LAN (local area network), or the like.

In this regard, the number of electronic devices 100, terminal devices 200 and service terminal devices 300 that are connected to the network NW is not limited to one, but may be plural. Also, one terminal device 200 may be connected to a plurality of electronic devices 100.

The electronic device 100 is, for example, a printer. Alternatively, the electronic device 100 may be a scanner, a facsimile machine, or a copy machine. The electronic device 100 may be a complex machine (MFP: multifunction peripheral) having a plurality of functions. A complex machine having a print function may be an example of printers. The terminal device 200 may be mobile terminal device, such as a smartphone, a tablet terminal, or the like, and may be a device, such as a PC (personal computer), or the like. The electronic device 100 and the terminal device 200 are installed at the side of a customer, such as a company, a store, and the like. That is to say, the electronic device 100 and the terminal device 200 are devices that are used by a service user. The electronic device 100 and the terminal device 200 are connected via a communication line. The communication line may be a dedicated line, such as a cable, or the like, or may be a network line, such as a LAN, or the like.

Figure 4:
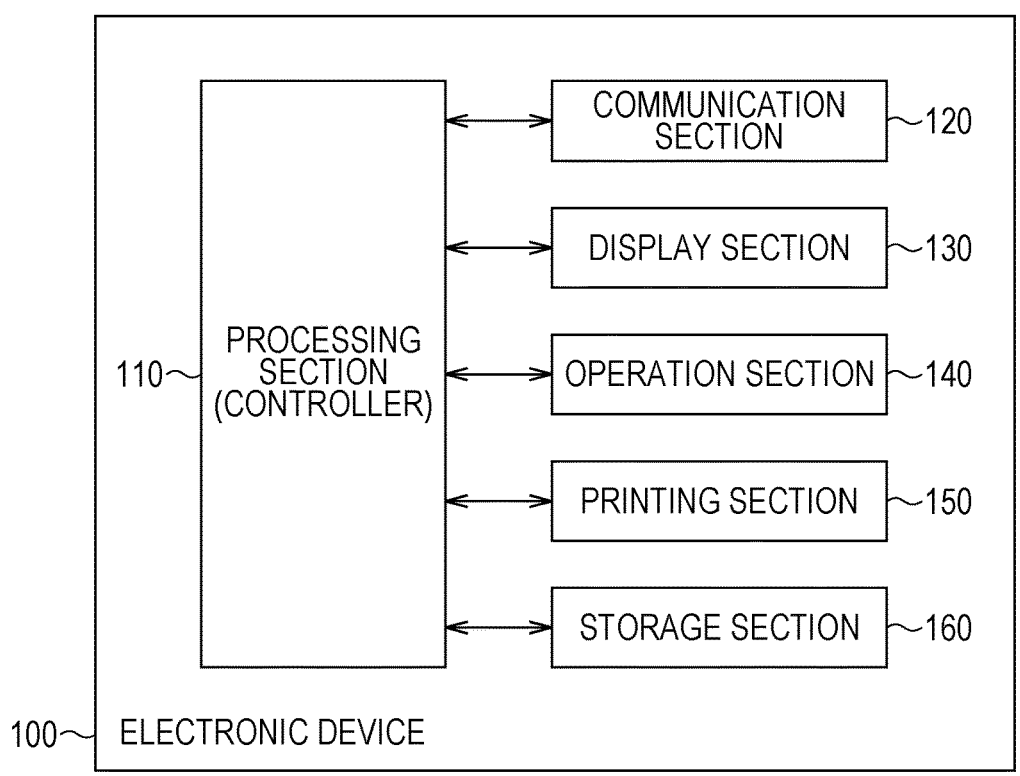
FIG. 4 is an example of the configuration of the electronic device.

FIG. 4 is a block diagram illustrating an example of the configuration of the electronic device 100. In this regard, FIG. 4 illustrates the electronic device 100 having a print function. In the following description, a description will be given of the example in which the electronic device 100 is a printer. The electronic device 100 includes a processing section 110, a communication section 120, a display section 130, an operation section 140, a print section 150, and a storage section 160.

The processing section 110 performs control on the communication section 120, the display section 130, the operation section 140, the print section 150, and the storage section 160. For example, it is possible for the processing section 110 to include a plurality of CPUs, such as a main CPU, a sub CPU, and the like, or a MPU (micro-processing unit). The main CPU performs control on each section of the electronic device 100 and overall control. When the electronic device 100 is a printer, the sub CPU performs, for example, various kinds of processing on printing.

The communication section 120 is a communication interface of a wireless communication chip, or the like, and performs communication with the other devices including the terminal device 200. The display section 130 includes a display, or the like that displays various kinds of information to a user, and the operation section 140 includes a button, or the like that receives input operation from the user. In this regard, the display section 130 and the operation section 140 may be integrated, for example, by a touch panel.

The print section 150 includes a print engine. The print engine refers to a mechanical configuration that performs printing of an image on a print medium. The print engine includes, for example, a transport mechanism, an ink jet discharge head, a drive mechanism of the carriage including the discharge head, and the like. Also, the print engine includes a maintenance mechanism for performing cleaning and flushing of discharge heads. The print engine discharges ink from the discharge head on the print medium transported by the transport mechanism so as to print an image on a print medium. The print medium may be paper, cloth, and the other medium. In this regard, the specific configuration of the print engine is not limited to the configuration exemplified here, and the configuration in which printing is performed with toner using an electrophotographic method may be employed.

The storage section 160 stores various kinds of information, such as data, programs, and the like. The processing section 110 and the communication section 120 operates, for example, using the storage section 160 as a work area. The storage section 160 may be a semiconductor memory, such as an SRAM, a DRAM, or the like, a register, a magnetic storage device, such as a hard disk device, or the like, or an optical storage device, such as an optical disc device, or the like.

Figure 5:
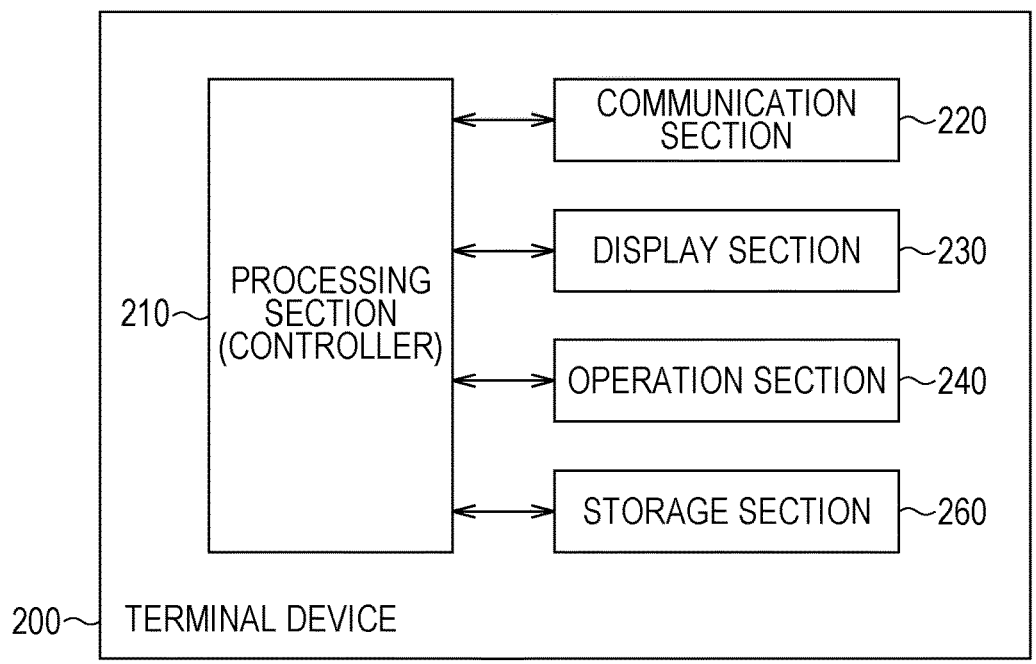
FIG. 5 is an example of the configuration of a terminal device.

FIG. 5 is a block diagram illustrating an example of the configuration of the terminal device 200. The terminal device 200 includes a processing section 210, a communication section 220, a display section 230, an operation section 240, and a storage section 260.

The processing section 210 controls each section, namely the communication section 220, the display section 230, the operation section 240, and the storage section 260. The processing section 210 is a processor, such as a CPU, or the like. The communication section 220 is a communication interface, such as a wireless communication chip, or the like, and performs communication with the other devices including the electronic device 100. The display section 230 is a display that displays various kinds of information to the user, or the like. The operation section 240 is a button that receives input operation from the user, or the like. In this regard, the display section 230 and the operation section 240 may be integrally configured, for example, by a touch panel.

The storage section 260 stores various kinds of information, such as data, programs, and the like. The processing section 210 and the communication section 220 operate, for example, using the storage section 260 as a work area. The storage section 260 may be a semiconductor memory, a register, a magnetic storage device, or an optical storage device.

Figure 7:
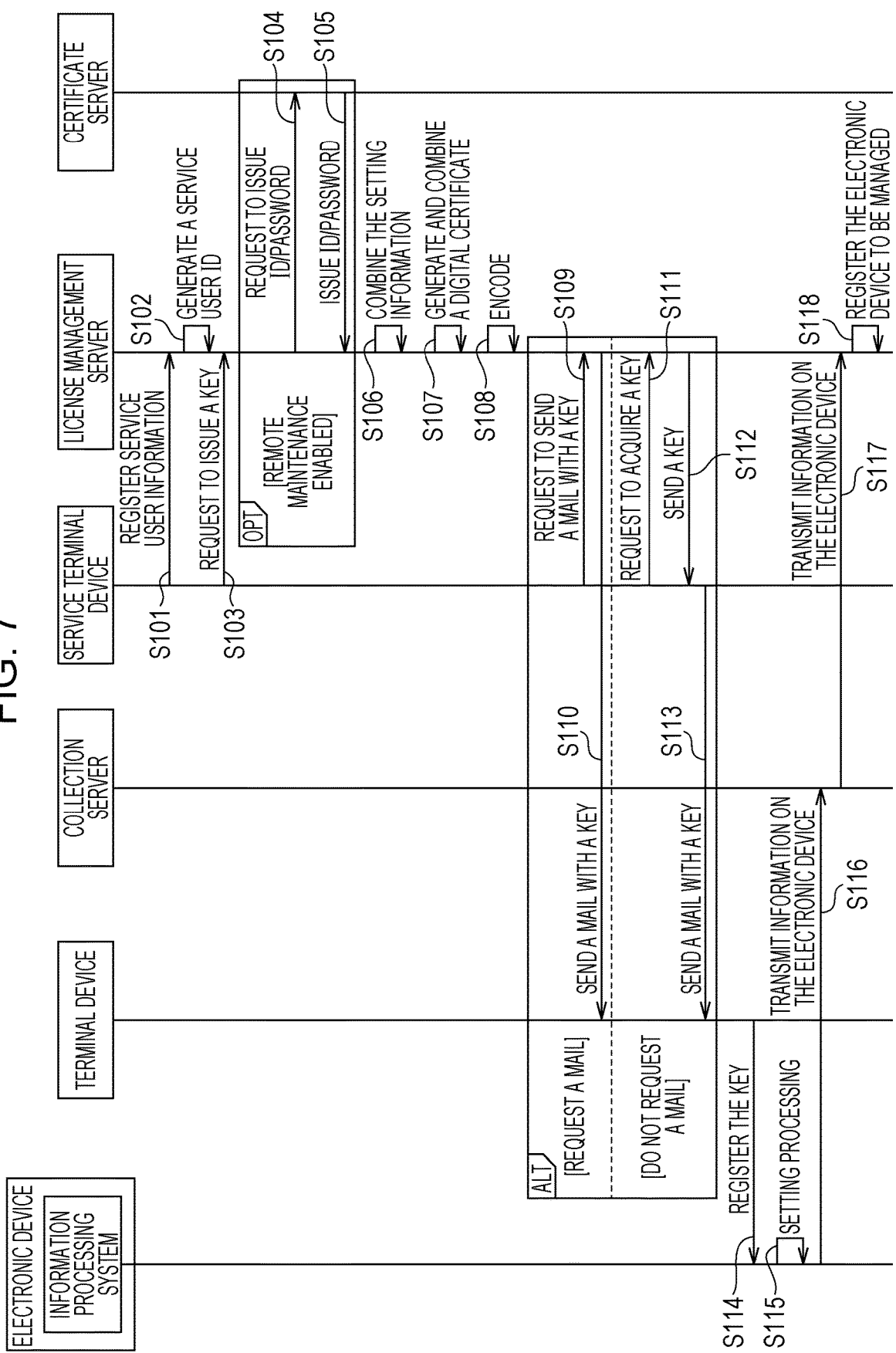
FIG. 7 is an explanatory diagram of the processing sequence on generation and registration of the license key.
Figure 12:
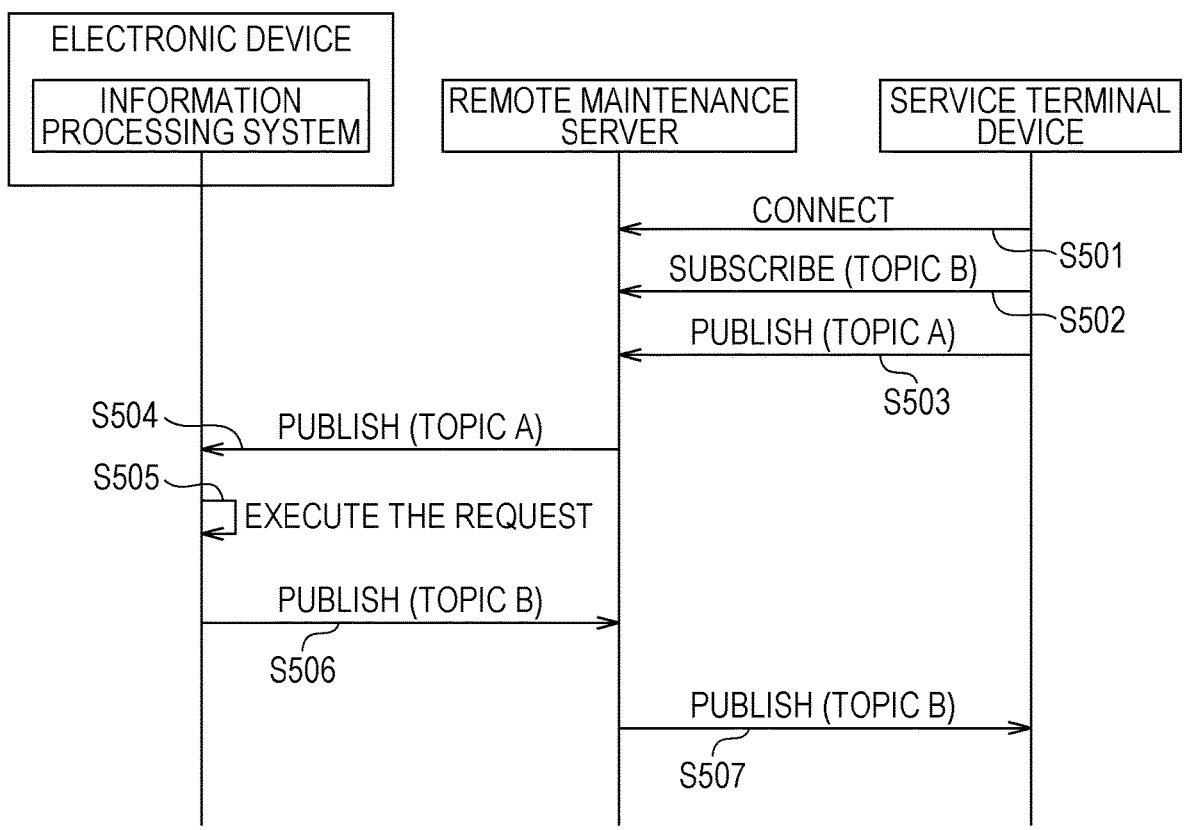
FIG. 12 is an explanatory diagram of the processing sequence at the time of performing remote maintenance.

The service terminal device 300 and the server system 400 are devices used by a service provider. The service terminal device 300 may be a mobile terminal device, such as a smartphone, a tablet terminal, or the like, a PC, or the like. Also, the service terminal device 300 may include a plurality of devices. For example, the service terminal device 300 described later with reference to FIG. 7 is a device to be used by a person in charge who registers and manages a service user. The service terminal device 300 described later with reference to FIG. 12 is a device that is used by a service man who performs maintenance of the electronic device 100. These devices may be realized by a same device, or may be realized by different devices with each other. The configuration of the service terminal device 300 is the same as that of the terminal device 200, and thus the detailed description will be omitted.

Figure 6:
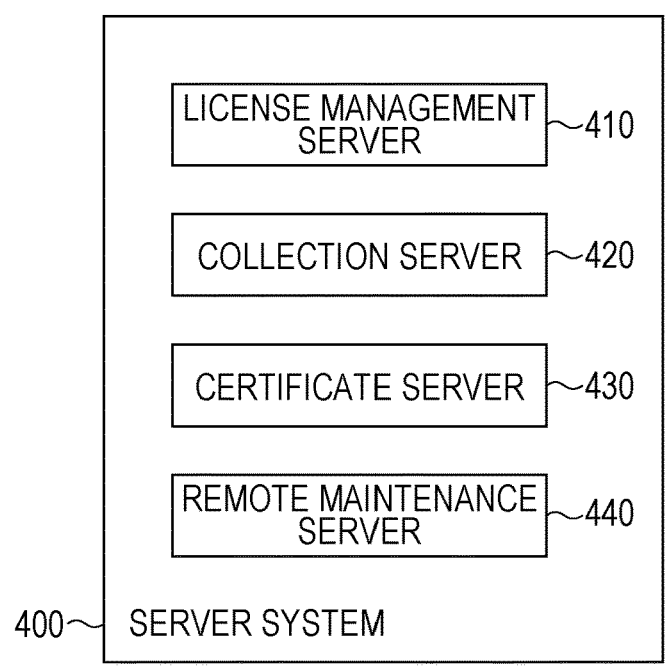
FIG. 6 is an example of the configuration of the server system.

FIG. 6 is an example of the configuration of the server system 400. The server system 400 includes a license management server 410, a collection server 420, a certificate server 430, and a remote maintenance server 440. In this regard, these servers may be physical servers individually different with each other or may be virtual servers that run on the same physical server. Also, each server, such as the license management server 410, and the like may be realized by distributed processing in a plurality of physical servers. Each server is a computer including a processing section, a communication section, a storage section, an operation section, and the like. The processing section is, for example, a processor. The communication section is, for example, a communication interface. The storage section is, for example, a semiconductor memory, a magnetic storage device, or the like. The operation section is an operation interface, for example, an operation button, a touch panel, or the like.

The license management server 410 performs processing on the issue and the management of a license key according to the present embodiment. The collection server 420 collects information from the electronic device 100. The collection server 420 is, for example, a database server. The certificate server 430 performs issue processing of an electronic certificate. The certificate server 430 operates as a certificate authority. The remote maintenance server 440 performs remote maintenance of an electronic device 100. The remote maintenance server 440 is, for example, an MQTT (Message Queuing Telemetry Transport) server, and performs processing for transmitting a maintenance instruction received from the service terminal device 300 used by a service man to the electronic device 100. The detailed description will be given later of the processing on each server.

The information processing system 10 illustrated in FIG. 1 is included, for example, in the electronic device 100. In other words, it is possible to apply a method according to the present embodiment to the electronic device 100 including the communication section 120 and the processing section 110. The communication section 120 receives a license key for the electronic device 100 to utilize a service. A license key according to the present embodiment includes setting information to be used for utilizing the service. The processing section 110 obtains the setting information included in the license key and performs setting processing for utilizing the service based on the obtained setting information. In this manner, it becomes possible for the electronic device 100 to obtain a license key for utilizing the service and to perform setting processing necessary for utilizing the service.

In this regard, the information processing system 10 according to the present embodiment may be included in the terminal device 200, or may be realized by the distributed processing of the electronic device 100 and the terminal device 200.

Also, it is possible to apply a method according to the present embodiment to a service system for utilizing a service using the electronic device 100. As illustrated in FIG. 3, the service system includes the server system 400 that issues a license key for utilizing a service and the electronic device 100 that obtains the license key issued by the server system 400. The license key issued by the server system 400 includes the setting information to be used at the time of utilizing the service. The electronic device 100 performs setting processing for utilizing the service based on the setting information included in the obtained license key.

In this manner, it is possible to realize a system that performs the issue processing of a license key and the setting processing using the license key. It becomes possible to associate the generation rule of a license key based on the setting information and the restoration of the setting information based on the license key, and thus it becomes possible to suitably perform the setting processing.

3. Details of Processing

Detailed descriptions will be given of the processing on the issue of a license key, the registration of the license key to the electronic device 100, the use of the service using the setting information, and the like. In the following, a description will be given on the assumption that the information processing system 10 is included in the electronic device 100, and each section of the electronic device 100 performs the processing according to the present embodiment. However, in the following description, it is possible to replace the processing section 110 of the electronic device 100 with the processing section 13 of the information processing system 10, and replace the communication section 120 of the electronic device 100 with the acquisition section 11 of the information processing system 10. Also, considering that the information processing system 10 according to the present embodiment may be included in a device other than the electronic device 100, it is possible to replace the processing section 110 of the electronic device 100 with the processing section 210 of the terminal device 200, or the like.

3.1 Specific Example of Service

First, a description will be given of a specific example of the service. The service according to the present embodiment is a service including monitoring the electronic device 100 by the monitoring server. More specifically, the service according to the present embodiment is a service in which the electronic device 100 transmits operation information to the above-described monitoring server, and the monitoring server monitors the operating state of the electronic device 100 based on the operation information. Here, the monitoring server is specifically the collection server 420. Also, the information transmitted to the collection server 420 is, for example, the operation information representing the operating state of the electronic device 100.

When the electronic device 100 is a printer, the operation information of the electronic device 100 includes information on the remaining amount of ink included in an ink container, the empty capacity of a maintenance box, the status of the printer, the number of print pages per single-sided printing/double-sided printing for each color/monochrome, and the like. Also, the operation information may include information representing the operation environment of the electronic device 100. For example, the operation information may include temperature information, humidity information, atmospheric pressure information, and the like.

An ink container may be an ink tank or an ink cartridge. A maintenance box is a container that contains ink discharged by maintenance, such as flushing and cleaning of a print head, and the like. Flushing represents the operation to discharge ink in an area different from a print area, and cleaning represents the operation to suck ink in a print head using a pump, or the like. The status represents information indicating that the printer is in any one of the printing state, the idle state, the error state, and the like.

In the case of using the monitoring service, the setting information includes the destination information of the monitoring server. The processing section 110 of the electronic device 100 performs setting processing for determining a transmission destination of the information of the electronic device 100 based on the destination information included in the setting information.

For example, the processing section 110 of the electronic device 100 is configured to perform the processing for collecting the operation information on the electronic device 100 and the processing for transmitting the collected operation information to a given destination. For example, the storage section 160 stores the information transmission program for executing the processing described above, and the processing section is configured to perform the operation in accordance with the information transmission program. At this time, by including the destination information in the setting information, it becomes possible to transmit the operation information to a suitable destination for an authorized service user. Accordingly, it is possible to prevent the operation information from leaking out to an improper destination, and the like.

In this regard, the destination information here may be the IP address of the collection server 420 or the URL (Uniform Resource Locator) itself. However, the destination information is not limited to this and may be a part of the URL. For example, consider the example in which the URL of the collection server 420 is "https://aaa.bbb.ccc/ddd". In this case, the destination information included in the setting information is, for example, a character string "aaa.bbb.ccc" representing a domain or information capable of identifying the character string.

The electronic device 100 holds information for identifying the URL of the collection server 420, for example, data such as "ddd" in advance. When the processing section 110 of the electronic device 100 obtains the destination information, the processing section 110 concatenates "https" corresponding to the protocol, the obtained destination information "aaa.bbb.ccc", and the held data "ddd" with supplementing colons and slashes so as to perform the processing for generating the URL of the collection server 420. In this manner, when a part of the URL is obtained as the destination information, it is possible to suitably identify the transmission destination of the information.

Also, each server included in the server system 400 according to the present embodiment is a server managed by a service provider. It is therefore thought that a part of the URL is common to the plurality of servers. For example, when the URL of the certificate server 430 is "https://aaa.bbb.ccc/eee", up to the domain name is common to the collection server 420 and the certificate server 430, and the directory names are different. The electronic device 100 holds data "eee" for identifying the certificate server 430 in addition to "ddd", which identifies the collection server 420. In this manner, it is possible to identify both of the URLs of the collection server 420 and the certificate server 430 based on one piece of destination information "aaa.bbb.ccc".

Also, the service according to the present embodiment is a service including remote maintenance of the electronic device 100 by remote operation from an external device. Here, the external device is, for example, the service terminal device 300 to be used by a service man. The remote operation is operation for specifically performing maintenance of the electronic device 100. However, in addition to the remote maintenance, it is permissible to perform the other operation on the electronic device 100 as the remote operation, such as operation to instruct print execution, change operation of the print setting, for example, the print speed, the paper size, and the like.

In the case of using the remote maintenance service, the setting information includes the access information for obtaining the certificate information to be used for transmission and reception of information in the remote operation from the certificate server 430. The certificate information here is information, for example, that includes an electronic certificate and a private key. Also, the access information is information for accessing the certificate server 430, for example, an ID and a password for logging in the certificate server 430. The processing section 110 of the electronic device 100 performs processing for obtaining certificate information from the certificate server 430 based on the access information included in the setting information and receiving remote operation using the certificate information.

From a standpoint of a service user, use of a remote maintenance service that permits access from an external device has a high risk in security compared with the monitoring service. On that point, by using certificate information, it becomes possible to use a remote maintenance service using a secure communication. For example, when the service terminal device 300 performs remote operation of the electronic device 100 via the remote maintenance server 440, the electronic device 100, the service terminal device 300, and the remote maintenance server 440 individually obtains certificate information including an electronic certificate. The mutual authentication between the service terminal device 300 and the remote maintenance server 440, and the mutual authentication between the electronic device 100 and the remote maintenance server 440 are performed. In this manner, it is possible to prevent a third person different from the service provider from performing the remote operation, and prevent the electronic device 100, which is not the target of the remote maintenance service, from becoming the target of the remote operation. In this regard, a secure communication is, for example, a communication in accordance with the protocol, such as SSL (Secure Socket Layer), TLS (Transport Layer Security), and the like, but the other protocols may be used. Also, authentication using certificate information may be one-way authentication.

In this regard, it is thought that there is a method of storing certificate information in the storage section 160 in advance at the time of shipment of the electronic device 100. However, when electronic certificates are separately given to a plurality of electronic devices 100, a heavy load is imposed at the time of manufacturing, and thus this might result in a cost increase. Also, when a common electronic certificate is given to a plurality of electronic devices 100, a risk in security might occur in a large number of the electronic devices 100 by leakage of one electronic certificate. When a customer who does not use the remote maintenance service purchases the electronic device 100, an electronic certificate is originally unnecessary. In consideration of the above, in the present embodiment, after a contract of using the remote maintenance service is made, each of the electronic devices 100 separately obtains certificate information.

In this regard, the processing section 110 may obtain destination information of the remote operation server to be used for the remote operation from the certificate server 430. The remote operation server here is, for example, the remote maintenance server 440. In this manner, it becomes possible for the electronic device 100 to be connected to the remote operation server having the destination specified by the certificate server 430. That is to say, the reliability of the destination information becomes high, and thus it becomes possible to prevent improper remote operation.

3.2 Generation of License Key and Registration to Device

FIG. 7 is an explanatory diagram of the processing sequence according to the present embodiment. In advance to the processing, a contract on the service is made between a service provider and a service user. In the contract, the service provider obtains information on the service user information, a service use area, and enabled/disabled of the remote maintenance service. The service user information is the information, such as the name and the address of a service user, and the like. The service use area is, for example, information that identifies a use country. Alternatively, the information may be information that identifies an area, such as Asia, Europe, North America, and the like. Also, in the following, it is assumed that there are two services: a monitoring service as a service and a remote maintenance service using the information transmitted in the monitoring service. At that time, it is possible to make a contract to use the monitoring service, but not to use the remote maintenance service. The information on whether the remote maintenance service is enabled or disabled is the information on whether or not the service user has made a contract to use the remote maintenance service.

After the contract is made, a person in charge of registration of the service provider registers contract contents using the service terminal device 300. Specifically, the service terminal device 300 transmits the service user information to the license management server 410 and request registration (step S101). At this time, information on a service use area and enabled/disabled of a remote maintenance service is also transmitted to the license management server 410. The license management server 410 generates a service user ID and stores the service user ID and the service user information, and the like in association with each other (step S102).

Next, the service terminal device 300 requests the license management server 410 to issue a license key for using the service (step S103). The license management server 410 determines whether the remote maintenance service is enabled or disabled. When the remote maintenance service is enabled, the license management server 410 requests the certificate server 430 to issue a certificate server ID and a password (step S104). The certificate server 430 issues an ID and a password, and the license management server 410 obtains the ID and the password (step S105).

Next, the license management server 410 generates a license key to be issued to the target service user. Specifically, the license management server 410 combines a plurality of pieces of the setting information (step S106).

Figures 8, 9:
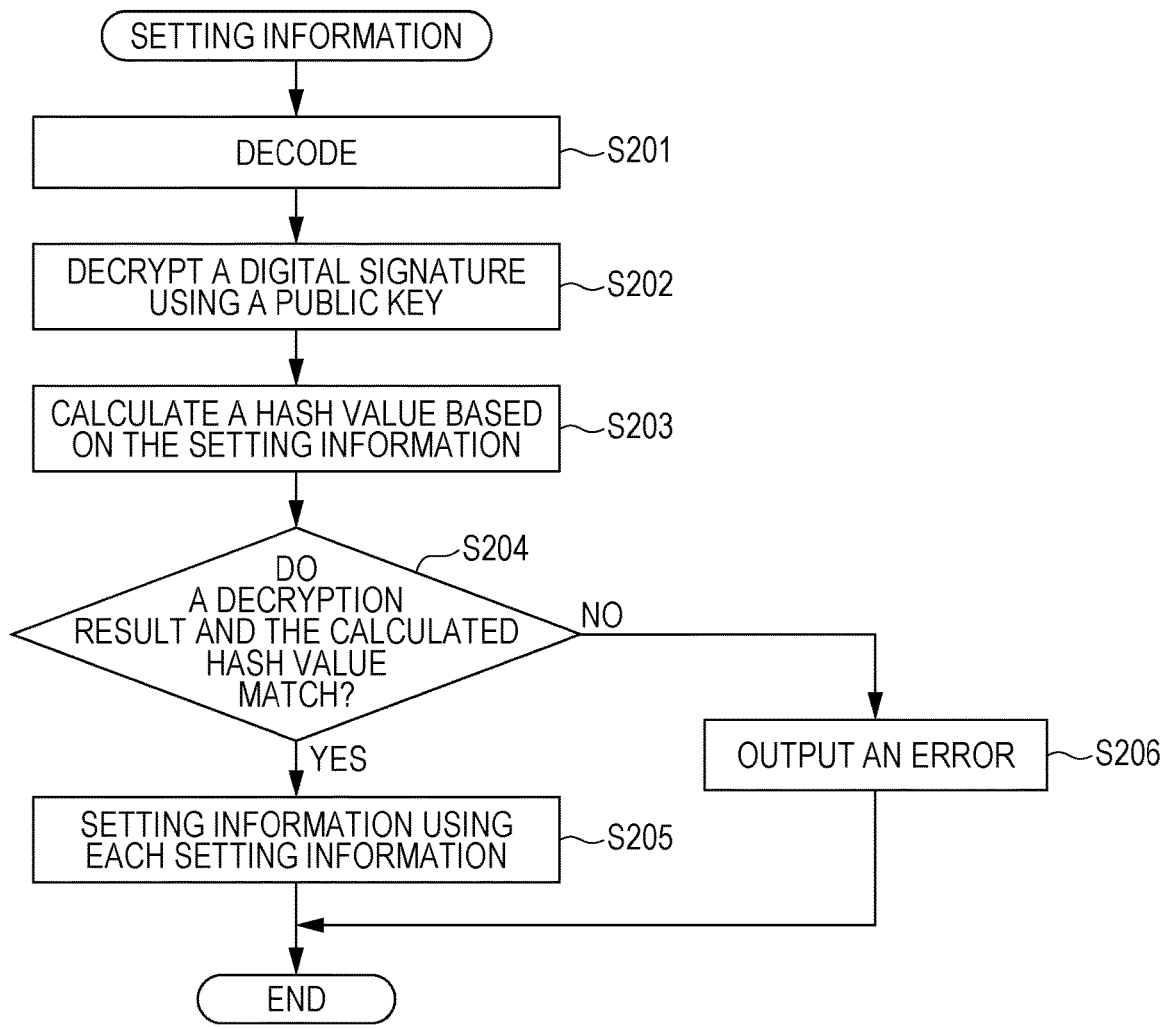
FIG. 8 is a specific example of setting information.
FIG. 9 is a flowchart illustrating the details of setting processing.

FIG. 8 is an example of setting information including a plurality of setting items. The setting information includes the destination information of the server, a service user ID, enabled/disabled of the remote maintenance service, a certificate server ID, and a certificate server password.

The destination information is, for example, information that represents a part of the URL as described above and is used for identifying the URLs of the collection server 420 and the certificate server 430. The destination information is, for example, the variable length data including the last one byte that is set to a specific value representing an end. The specific value is, for example, 0x00. In this regard, 0x denotes a hexadecimal value. In this regard, the servers, such as the collection server 420, and the like may be disposed for each area, such as Asia, Europe, or the like. In this case, the license management server 410 performs the processing for determining the destination information based on the service use area obtained in step S101.

A service user ID is information, generated in step S102, for uniquely identifying a service user. A service user ID is, for example, fixed length data having a predetermined number of bytes. By including a service user ID in the setting information, it is possible to prevent the service user from mistakenly inputting an ID assigned to the service user, or the like.

The information that represents enabled/disabled of the remote maintenance service is the information transmitted from the service terminal device 300 based on the contract in step S101. The information that represents enabled/disabled may be one-bit flag data or may be one-byte data in consideration that the length of the setting information is determined in units of integer bytes.

An ID and a password of the certificate server 430 refer to information issued in step S105. The ID and the password are, for example, individually fixed length data having a predetermined number of bytes. In this regard, when the remote maintenance service is disabled, the ID and the password of the certificate server 430 are set to specific values. For the specific values, it is possible to use any value that are not duplicated with valid ID and password, for example, values having all 0 bits.

For example, the license management server 410 combines the destination information of the server, a service user ID, enabled/disabled of the remote maintenance service, a certificate server ID, and a certificate server password in this order. However, the processing by the license management server 410 at the time of generating a license key and the processing at the time of interpreting the license key in the information processing system 10 ought to be performed in accordance with a common rule, and the specific combination order is not limited to this.

Next, the license management server 410 generates a digital signature for the combined setting information (step S107). The license management server 410 applies a given hash function to the setting information so as to generate a hash value, and generates a digital signature by encrypting the hash value using the own private key. The license management server 410 combines the generated digital signature at the MSB (most significant bit) side of the setting information. However, it is possible to change the combination order.

The license management server 410 generates a license key by encoding the information produced by combining the digital signature and the setting information using an encoding method, such as Base64, or the like (step S108). As described above, the encoding method is not limited to Base64.

The service provider may request the license management server 410 to transmit a mail including the license key to the service user using the service terminal device 300. In this case, the service terminal device 300 requests the license management server 410 to transmit a mail including the license key (step S109). The license management server 410 identifies a terminal device 200 based on the service user information obtained in step S101, and transmits a mail including the license key to the terminal device 200 (step S110).

Alternatively, the service terminal device 300 may request the license management server 410 to obtain a license key, and receive a license key as a reply to the request (step S111 and step S112). In this case, the service terminal device 300 transmits a mail including the license key to the terminal device 200 (step S113).

The service user performs processing for registering the license key in the electronic device 100 using the terminal device 200 (step S114). For example, the electronic device 100 starts the Web server, and the terminal device 200 accesses the electronic device 100 using a Web browser. The electronic device 100 transmits an HTML (HyperText Markup Language) file corresponding to the input screen of the license key to the terminal device 200, and the terminal device 200 displays the input screen on the display section 230. The service user, for example, copies a license key included in the mail and pastes the license key in the input field on the input screen so as to easily input the license key. In this regard, for example, a service user may directly input a license key by using the operation section 140 of the electronic device 100.

The processing section 110 of the electronic device 100 performs setting processing for using the service based on the license key (step S115). FIG. 9 is a flowchart illustrating the setting processing performed by the processing section 110. When the processing is started, the processing section 110 first decodes the license key (step S201). For example, the processing for returning the information, which has been converted into the ASCII format using Base64, to binary data. The processing section 110 knows up to what bit is a digital signature out of the binary data, and from what bit is the setting information.

The processing section 110 performs decryption processing of the digital signature using the public key of the license management server 410 so as to generate a first hash value (step S202). Also, the processing section 110 applies a given hash function to the setting information so as to generate a second hash value (step S203). The processing section 110 determines whether or not the first hash value matches the second hash value (step S204).

When the two hash values match, the license key is determined to be a license key that has been issued by the authorized license management server 410 and not has been tampered with. Accordingly, the processing section 110 performs specific setting processing using the setting information (step S205). First, the processing section 110 disassembles the combined setting information into each piece of information, that is, server destination information, a service user ID, enabled/disabled of the remote maintenance service, a certificate server ID, and a certificate server password. Since each piece of information is variable length data or fixed length data that includes its end having identifiable information, it is possible to suitably disassemble the combined setting information.

The processing section 110 sets the URL of the collection server 420 in the monitoring service and the ULR of the certificate server 430 in the remote maintenance service based on the destination information. Also, when the remote maintenance service is enabled, the processing section 110 sets the ID and the password as the information for accessing the certificate server 430. For example, the information processing system 10 includes an information transmission module to be used for the monitoring service and the remote maintenance module, and the processing section 110 of the electronic device 100 performs operation in accordance with those modules. In this case, the processing section 110 writes information, such as a URL, an ID, a password, and the like in the specific area of a specific setting file to be read by the information transmission module and the remote maintenance module so as to perform the setting processing. However, the specific setting processing is not limited to the edit processing of the setting file, and various variations may be made.

In this regard, a service using a plurality of electronic devices 100 may be provided based on one license key and one service user ID. For example, when a service user possesses a plurality of electronic devices 100, it is possible to use the monitoring service and the remote maintenance service using the electronic devices 100. In this case, the management of the transmitted information and the maintenance may be performed separately for each of the electronic devices 100. Also, when one electronic device 100 is targeted, the model of the electronic device 100, and the like may be considered at the time of performing a service, such as maintenance, and the like. Accordingly, even when only one electronic device 100 is provided, it is meaningful to identify an electronic device 100 to be a service target.

The electronic device 100 therefore transmits information including the identification information of the electronic device 100. The identification information may be a serial number that the manufacturer assigned to the electronic device 100, a MAC address, or the other information by which the electronic device 100 is identifiable. In the example in FIG. 7, the electronic device 100 transmits the identification information of the electronic device 100 to the collection server 420 (step S116), and the collection server 420 transfers the identification information to the license management server 410 (step S117). In this regard, the processing in step S116 may be performed subsequently to the setting processing or as first information transmission in the monitoring service. In that case, the information to be transmitted to the collection server 420 is information produced by associating the operation information with the identification information of the electronic device 100 and the service user ID.

The license management server 410 performs processing for registering an electronic device 100 to be managed based in the obtained information (step S118). For example, the license management server 410 has stored service user information and a service user ID in association with each other in step S102. Accordingly, by further storing the identification information of an electronic device 100 in association with the information, it becomes possible to manage a service user and an electronic device 100 used by the service user in association with each other.

In this regard, the setting information according to the present embodiment may include contract state information of a service. For example, the information representing enabled/disabled of the remote maintenance service in FIG. 8 is included in the contract state information. In this manner, when it is possible to provide a plurality of services, it becomes possible to select and use a part of the services. Also, it becomes possible to maintain the structure of the setting information regardless of the contract state of a service. The structure of the setting information refers to the number and the order of setting items, and the like included in the setting information.

Also, the contract state information of a service may include not only whether or not a contract exists, but specific contract contents. For example, consider an accounting service that performs accounting processing based on the operation information collected in the monitoring service. In the accounting service, a contract is made in such a way, for example, "the charge amount is Z YEN when the number of A4 color printing is less than or equal to X per month, and the number of A4 monochrome printing is less than or equal to Y". The contract state information may be information that represents these specific contract contents. Also, the processing section 110 of the electronic device 100 may perform the setting processing for changing the print setting based on the contract state information in the setting processing. The print setting here may refer to, for example, the print mode in the default setting is either color/monochrome, or the default setting on the paper size.

For example, when X>Y in the contract described above, the processing section 110 may perform the processing for setting the print mode to color by default as the setting processing. Alternatively, the processing section 110 may perform the processing for setting the paper size to A4 by default in the contract described above. In this manner, it becomes possible not only to perform the service for managing the consumption amount and the charge amount, but also to perform the print setting suitable for the service.

3.3 Flow at the Time of Service Execution

Figure 10:
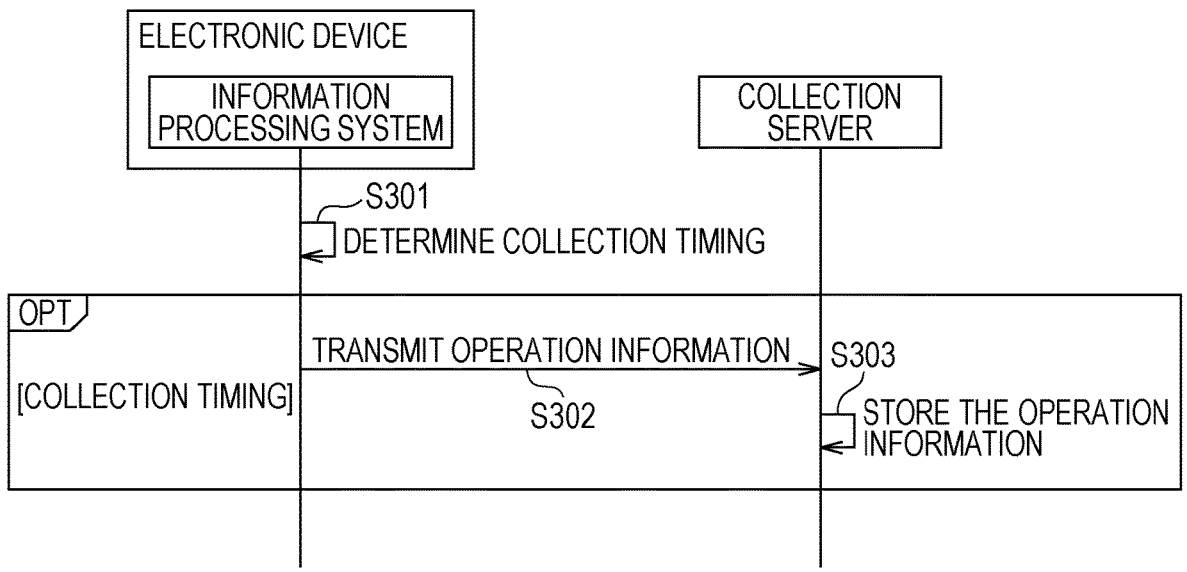
FIG. 10 is an explanatory diagram of the processing sequence of a monitoring service.

FIG. 10 is an explanatory diagram of the processing sequence of a monitoring service. When the processing is started, the processing section 110 of the electronic device 100 determines whether or not it is time to transmit the information (step S301). For example, the processing section 110 may periodically transmit the information. For example, when the information is transmitted at 0 o'clock, the processing in step S301 is the determination whether or not it is 0 o'clock. In this regard, it is possible to carry out various variations as to the frequency of periodical and the timing. Alternatively, the processing section 110 may transmit the information when an event has occurred in the electronic device 100 as a trigger. The event here is a specific event in the electronic device 100, such as an occurrence of an error, or the like. In a narrow sense, the event represents an event that necessitates informing to a service user, a service man, or the like. In this case, the processing in step S301 is a determination as to whether or not an event has occurred.

When determined that it is time to perform transmission in step S301, the processing section 110 transmits the operation information of the electronic device 100 to the collection server 420 (step S302). Specifically, the processing section 110 performs processing for causing the communication section 120 to transmit the operation information, acquisition timing of the operation information, a service user ID, the identification information of the electronic device 100, and the like in association with each other. The collection server 420 stores the information received from the electronic device 100 (step S303).

Figure 11:
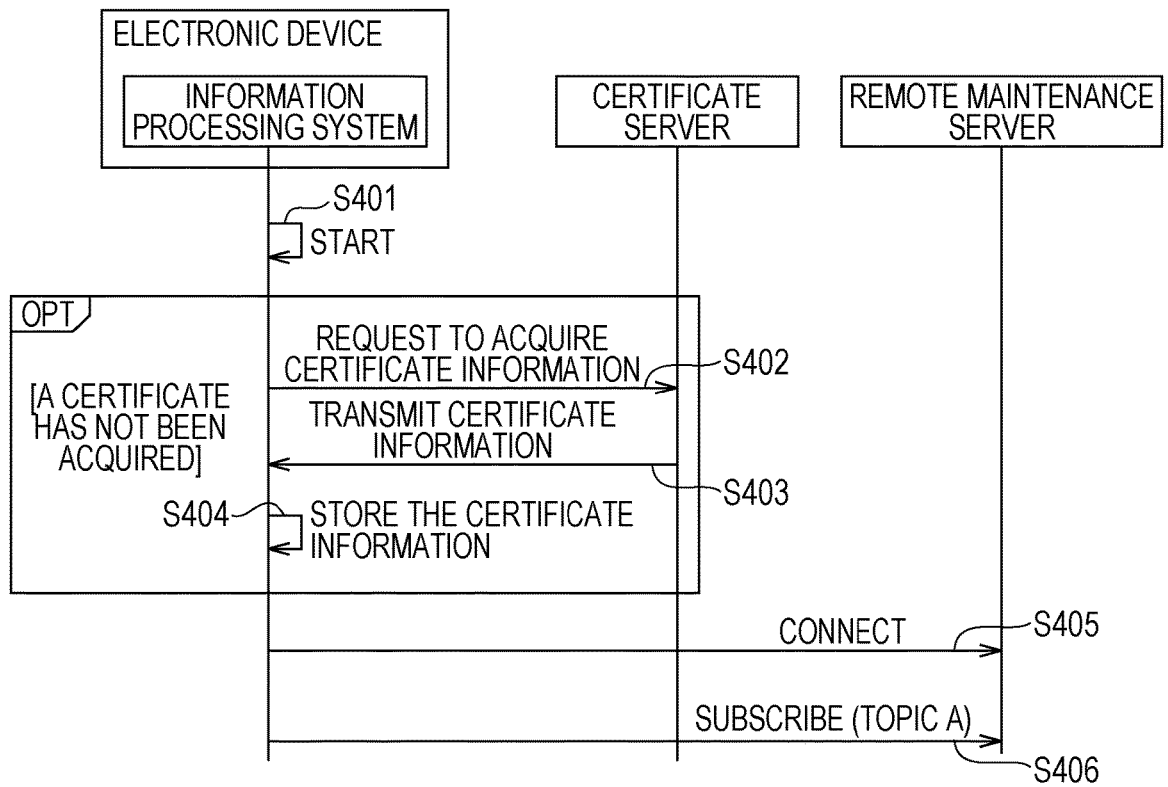
FIG. 11 is an explanatory diagram of the starting sequence of the electronic device in a remote maintenance service.

FIG. 11 is an explanatory diagram of the processing sequence executed at the time of starting the electronic device 100 when the remote maintenance service is enabled. When the electronic device 100 is started (step S401), the processing section 110 determines whether or not certificate information to be used for the remote maintenance service has been obtained.

When certificate information has not been obtained, the electronic device 100 requests the certificate server 430 to obtain certificate information (step S402). The URL of the certificate server 430, an access ID, and a password have been set in the setting processing as described above. The certificate server 430 transmits the certificate information including an electronic certificate, a private key, and the destination information of the remote maintenance server 440 to the electronic device 100 as a response to the request in step S402 (step S403). The electronic device 100 stores the obtained certificate information in the storage section 160 (step S404). When certificate information has been obtained, the processing from step S402 to S404 is omitted.

Next, the electronic device 100 connects to the remote maintenance server (step S405). For example, authentication processing using the electronic certificate is performed in step S405. The registration of a specific topic is performed (step S406). The remote maintenance server 440 is a broker equivalent to a server in MQTT. A broker here is also denoted as a message broker. The electronic device 100 and the service terminal device 300 are clients that perform communication conforming to MQTT.

The broker of MQTT receives a message from the client and transmits the received message to the corresponding destination client. The client registers the kind of message to be requested in the broker in advance. More specifically, a message of MQTT includes a topic and data. The reception client registers the topic of the requested message in the broker. The transmission client transmits the data to the broker with specifying a topic. When the topic registered by the client matches the topic of the message, the broker transmits a message to the client. Registration of a topic also refers to subscribe. Here, a topic registered by the electronic device 100 is denoted as topic A.

FIG. 12 is an explanatory diagram of the processing sequence at the time when a service man performs the remote maintenance from the service terminal device 300. In this regard, although omitted in FIG. 12, for example, a service man accesses the collection server 420 using the service terminal device 300 so as to monitor the operating state of the electronic device 100 of which maintenance is handled by the service man. When the electronic device 100 determines that maintenance is necessary, the processing in FIG. 12 is started. Alternatively, the collection server 420, or the like automatically monitors the operating state, and when a specific condition is met, informing processing to the service terminal device 300 may be performed.

The service terminal device 300 connects to the remote maintenance server 440 and registers a topic B (steps S501 and S502). In this regard, the processing of step S501 and S502 may be performed at the time of starting the remote maintenance or may be performed in advance at different time when the service terminal device 300 is started, or the like.

The service terminal device 300 transmits a message to the remote maintenance server 440 with specifying data instructing maintenance and a topic corresponding to the electronic device 100 (step S503). Message transmission is also denoted as publish. In this regard, it is assumed that it is possible for the service terminal device 300 to obtain a corresponding relationship between the electronic device 100 and the topic registered by the electronic device 100. For example, the corresponding information between the electronic device 100 and the topic is stored in the collection server 420, or the like, and it is possible for the service terminal device 300 to browse the information. In the example in FIG. 12, in order to perform remote maintenance of the electronic device 100 that has registered a topic A, the service terminal device 300 transmits a message that specifies the topic A.

The remote maintenance server 440 transmits data to the client that has registered the topic A. In this case, the remote maintenance server 440 transmits the data that instructs maintenance execution, which has been transmitted from the service terminal device 300 to the electronic device 100 (step S504).

The electronic device 100 that has received the data performs maintenance in accordance with the received data (step S505). The maintenance here may be print head cleaning, flushing, or the other maintenance. It is possible to perform various kinds of maintenance in accordance with the data transmitted from the service terminal device 300.

Also, in MQTT, it is possible for each client to operate both as a transmission client and a reception client. Not only the service terminal device 300 transmits a message to the electronic device 100 as a transmission client, but it is possible for the electronic device 100 to transmit a message to the service terminal device 300 as a transmission client.

For example, the electronic device 100 transmits a message with specifying data representing a maintenance result and a topic B corresponding to the service terminal device 300 (step S506). The maintenance result may be the information representing execution completion of the maintenance or the information representing the state of the electronic device 100 after the maintenance. For example, when the electronic device 100 is capable of automatically detecting the number of nozzles with which a discharge failure has occurred, the maintenance result may be the number of discharge failures detected after taking measures, such as cleaning, or the like. The remote maintenance server 440 transmits the data to the client having registered the topic B. In this case, the remote maintenance server 440 transmits the data representing the maintenance result to the service terminal device 300 (step S507).

In this regard, although not illustrated in FIG. 11 and FIG. 12, when the power to the electronic device 100 is turned off, the topic A is unregistered, and the electronic device 100 and the remote maintenance server 440 are disconnected. When the power is on, the electronic device 100 and the remote maintenance server 440 are capable of being connected continuously. Accordingly, when a firewall is disposed between the electronic device 100 and the network NW, it is possible for the service terminal device 300 to perform the remote maintenance of the electronic device 100. However, although the example in which MQTT is used for the remote maintenance service has been described here, a remote maintenance service may be performed using communication conforming to the other communication standard.

Also, in FIG. 10 to FIG. 12, a description has been given of the example in which the electronic device 100 directly connects to the collection server 420, the certificate server 430, and the remote maintenance server 440. However, the communication between the electronic device 100 and each server may be performed via the terminal device 200. For example, in the monitoring service, the operation information of the electronic device 100 is stored in the storage section 260 of the terminal device 200, and is transmitted to the collection server 420 by the communication section 220 of the terminal device 200. Also, in the remote maintenance service, the terminal device 200 obtains and stores the certificate information. The terminal device 200 obtains the data instructing execution of the maintenance, which has been transmitted by the service terminal device 300, via the remote maintenance server 440, and instructs execution of the maintenance to the electronic device 100 based on the data. The electronic device 100 performs the maintenance based on the instruction of the terminal device 200, and transmits a maintenance result to the terminal device 200. The terminal device 200 transmits a message to the remote maintenance server 440 so as to transmit the maintenance result to the service terminal device 300.

As described above, an information processing system according to the embodiment is an information processing system for receiving a service using an electronic device, the information processing system including: an acquisition section configured to acquire a license key for using the service issued by a server system; and a processing section. The license key includes setting information to be used when the electronic device uses the service. The processing section acquires the setting information included in the acquired license key and performs setting processing of the electronic device based on the acquired setting information.

In this manner, it becomes possible to include the setting information in the license key for receiving the service. In other words, it is possible to use the data including the setting information as a license key for receiving the service. Thereby, it becomes possible to reduce the burden of a service user in the setting processing and to prevent a setting error.

Also, a service according to the present embodiment may be a service including monitoring the electronic device performed by a monitoring server. The setting information may include destination information of the monitoring server. The processing section may perform the setting processing for determining a transmission destination of information on the electronic device based on the destination information included in the setting information.

In this manner, when the monitoring service is realized that monitors the state of the electronic device by transmitting the information to the monitoring server, it becomes possible to reduce the burden on the service user in the setting processing of a transmission destination and a setting error.

Also, the service according to the present embodiment may be a service including remote maintenance of the electronic device by remote operation from an external device. The setting information may include access information for acquiring certificate information to be used for transmission and reception of information in the remote operation from a certificate server. The processing section may acquire the certificate information from the certificate server based on the access information included in the setting information and may perform processing for receiving the remote operation using the acquired certificate information.

In this manner, it becomes possible to realize a service for receiving remote maintenance by remote operation by a secure communication using a certificate. At that time, it becomes possible to reduce the burden on the service user in the setting processing for accessing the certificate server and a setting error.

Also, the processing section according to the present embodiment may acquire destination information of a remote operation server to be used for receiving the remote operation from the certificate server.

In this manner, it becomes possible to acquire information having a high reliability as the destination of the remote operation server.

Also, the license key according to the present embodiment may be information based on the setting information and a digital signature of an issuer of the license key given to the setting information.

In this manner, it becomes possible to reduce tampering with the license key, or the like.

Also, the license key according to the present embodiment may be information generated by encoding the setting information and the digital signature.

In this manner, it is possible to generate a license key by converting the original data including the setting information and the digital signature into a suitable data format. For example, when the original data, which is binary data, is encoding into the ASCII format, it is possible to improve the convenience at the time of inputting the license key.

Also, the setting information according to the present embodiment may include contract state information of the service.

In this manner, it becomes possible to perform the setting processing in accordance with the contract state.

Also, the service system according to the present embodiment is a service system for providing a service using an electronic device, the service system including: a server system configured to issue a license key for using the service; and the electronic device configured to acquire the license key issued by the server system. The license key issued by the server system includes setting information to be used when the service is used. The electronic device performs setting processing for using the service based on the setting information included in the acquired license key.

Also, the electronic device according to the present embodiment includes a communication section configured to receive a license key for an electronic device to use a service and a processing section. The license key includes setting information to be used when the service is used. The processing section acquires the setting information included in the license key and performs setting processing for using the service based on the acquired setting information.

In this regard, the detailed description has been given of the present embodiment as described above. However, it will be easily understood by those skilled in the art that many variations may be made without substantially departing from the new matters and the advantages of the present embodiment. Accordingly, all of these variations are to be construed within the scope of the present disclosure. For example, the terms that are described at least once with the terms having a broader sense or the same meaning in the specification or the drawings may be replaced with the different terms in any place in the specification or the drawings. Also, all the combinations of the present embodiment and variations are included in the scope of the present disclosure. Also, the configuration and the operation of the information processing system, the electronic device, the terminal device, the service terminal device, the server system, the service system, and the like are not limited to those described in the present embodiment, and various variations may be made.

What is claimed is:

1. An information processing system for receiving a service using an electronic device, the information processing system comprising:
   an acquisition section configured to acquire a license key for using the service issued by a server system, wherein the service includes remote maintenance of the electronic device by remote operation from an external device; and
   a processing section, wherein
      the license key includes setting information to be used when the electronic device uses the service,
      the setting information, included in the license key, includes access information to acquire certificate information to be used for transmission and reception of information from a certificate server in the remote operation; and
      the processing section acquires the setting information included in the acquired license key and performs setting processing of the electronic device based on the acquired setting information.

2. The information processing system according to claim 1, wherein
   the service includes monitoring the electronic device performed by a monitoring server,
   the setting information includes destination information of the monitoring server, and
   the processing section performs the setting processing for determining a transmission destination of information on the electronic device based on the destination information included in the setting information.

3. The information processing system according to claim 1, wherein the processing section acquires the certificate information from the certificate server based on the access information included in the setting information and performs processing for receiving the remote operation using the acquired certificate information.

4. The information processing system according to claim 3, wherein
   the processing section acquires destination information of a remote operation server to be used for receiving the remote operation from the certificate server.

5. The information processing system according to claim 1, wherein the license key is information based on the setting information and a digital signature of an issuer of the license key given to the setting information.

6. The information processing system according to claim 5, wherein the license key is information generated by encoding the setting information and the digital signature.

7. The information processing system according to claim 1, wherein the setting information includes contract state information of the service.

8. A service system for providing a service using an electronic device, the service system comprising:
- a server system configured to issue a license key for using the service; and
- the electronic device configured to acquire the license key issued by the server system, wherein
  - the service includes remote maintenance of the electronic device by remote operation from an external device,
  - the license key issued by the server system includes setting information to be used when the service is used,
  - the setting information, included in the license key, includes access information to acquire certificate information to be used for transmission and reception of information from a certificate server in the remote operation, and
  - the electronic device performs setting processing for using the service based on the setting information included in the acquired license key.

9. An electronic device comprising:
- a communication section configured to receive a license key for the electronic device to use a service, wherein the service includes remote maintenance of the electronic device by remote operation from an external device; and
- a processing section, wherein
  - the license key includes setting information to be used when the service is used,
  - the setting information, included in the license key, includes access information to acquire certificate information to be used for transmission and reception of information from a certificate server in the remote operation, and
  - the processing section acquires the setting information included in the license key and performs setting processing for using the service based on the acquired setting information.

\* \* \* \* \*